US007835824B2

(12) United States Patent
Matos (10) Patent No.: US 7,835,824 B2
(45) Date of Patent: Nov. 16, 2010

(54) SYSTEMS AND METHODS FOR DETECTING AND MANAGING THE UNAUTHORIZED USE OF A UNMANNED AIRCRAFT

(76) Inventor: Jeffrey A. Matos, 132 Hillandale Dr., New Rochelle, NY (US) 10804

( * ) Notice: Subject to any disclaimer, the term of this patent is extended or adjusted under 35 U.S.C. 154(b) by 370 days.

(21) Appl. No.: 11/899,827

(22) Filed: Sep. 6, 2007

(65) Prior Publication Data

US 2008/0255711 A1    Oct. 16, 2008

Related U.S. Application Data

(60) Provisional application No. 60/842,600, filed on Sep. 6, 2006.

(51) Int. Cl.
*G05D 1/00* (2006.01)

(52) U.S. Cl. .................. 701/2; 701/3; 701/11; 701/16; 701/23; 244/76 R (58) Field of Classification Search ..................... 701/2, 701/3, 11, 14, 16, 17, 36, 23; 244/76 R, 244/175
See application file for complete search history.

(56) References Cited

U.S. PATENT DOCUMENTS

| 3,678,256 | A | * | 7/1972 | Harenberg, Jr. | ............... | 701/16 |
| 6,917,863 | B2 | * | 7/2005 | Matos | ......................... | 701/16 |
| 2003/0130770 | A1 | * | 7/2003 | Matos | ......................... | 701/3 |
| 2006/0032978 | A1 | * | 2/2006 | Matos et al. | ............... | 244/118.5 |
| 2006/0220883 | A1 | * | 10/2006 | Matos | ........................ | 340/573.1 |

* cited by examiner

*Primary Examiner*—Gertrude Arthur Jeanglaud
(74) *Attorney, Agent, or Firm*—Karl F. Milde, Jr.; Eckert Seamans Cherin & Mellott, LLC

(57) ABSTRACT

A method for policing and managing the operation of a flying, unmanned aircraft in the event of usurpation of control of, malfunction of, or ill-intentioned use of, this aircraft includes the steps of (a) detecting inappropriate operation of the aircraft; (b) transmitting a takeover command to the aircraft to interrupt control of the operation of this aircraft by a first pilot and relinquish control of the aircraft to a second pilot; and (c) transmitting control commands to the aircraft to control its operation by the second pilot, until the need for alternate pilot control of the aircraft has ended or until the aircraft has landed safely.

26 Claims, 10 Drawing Sheets

SYSTEMS AND METHODS FOR DETECTING AND MANAGING THE UNAUTHORIZED USE OF A UNMANNED AIRCRAFT

CROSS-REFERENCE TO RELATED APPLICATIONS

This application claims priority from provisional application No. 60/842,600 filed Sep. 6, 2006. This application also incorporates by reference U.S. Pat. No. 6,917,863 and each of U.S. patent application Ser. Nos. 10/919,169, 11/373,712, 11/385,270 and 11/388,311.

BACKGROUND OF THE INVENTION

The present invention concerns a method and apparatus for "policing" unmanned aircraft, such as "umanned aerial vehicles" (UAs) and "unmanned aerial systems" (UASs). The invention is specifically directed to the problems posed by (1) a usurpation of control of an unmanned aircraft by an unauthorized third party, (2) the operation of a malfunctioning unmanned aircraft, and/or (3) the ill-intentioned use of an unmanned aircraft thus posing a danger to person and/or property.

SUMMARY OF THE INVENTION

The systems and methods described herein are intended to prevent the use of unmanned aircraft, e.g. UAs and UASs, hereinbelow "UA", for unauthorized and possibly ill-intentioned purposes.

The approaches to such prevention include:

A) Approach #1: Failure to provide a unique identification or password on request makes the UA subject to destruction.

This approach requires:
1) that all UA have a unique identification, "UI", consisting of digits, numbers, both or any reproducible information carrying identifier; and
2) that such identification is either permanently unalterable, or alterable only by an authorized person or entity; and
3) that such identification must be able to be presented at any time that an authorized person or entity requests;

The UI may be either:
1) supplied to the UA at the time of aircraft manufacture, or some later time substantially prior to takeoff;
2) supplied to the UA immediately prior to takeoff. Such pre-takeoff UI supply approaches parallel the encryption key supply approaches described in U.S. Pat. No. 6,917,863, and include generation of the UI:
  a) onboard the UA;
  b) from a remote control center "RCC"; or
  c) from a freestanding UI generation device; or
3) both: In this case the UI is supplied at some early instance and a password, "PW", is supplied immediately prior to takeoff. The password may have the same three possible sources as the UI.

A request for UI or PW presentation may be made at the time of takeoff, or at any time during a UA flight. If there is either no response or an incorrect response, corrective actions include:
1) dispatch an interceptor aircraft, "IAC", which may:
  a) further/better identify the UA; and/or
  b) determine that the UA flight should be terminated.
If flight termination is selected, IAC options include:
  a) disable or shoot down the UA using a weapon system aboard the IAC; or
  b) activate a self-destruct system—if included in the UA design [discussed hereinbelow]; and
2) activate a self-destruct system—if included—from the RCC.

B) Approach #2: Failure to comply with a pre-registered flight plan makes the UA subject to destruction.

In this approach, the UA is required to file a flight plan prior to takeoff. If the flight plan is unacceptable, takeoff is unauthorized, and any of the means for aircraft destruction or incapacitation discussed hereinabove and hereinbelow may be enacted.

Methods of monitoring compliance with the flight plan during flight include:
1) Equipment onboard the UA, continually compares the UA position as derived from GPS data or other aircraft locating means as is known in the art, (and the UA velocity vector) with the expected one, based on the flight plan. Any significant deviation from the flight plan is thus detected by onboard equipment and transmitted to an authority at a RCC, who has the options of further observation, investigation or action as described hereinabove;
2) The UA reports only a continuous, semi-continuous or intermittent stream of GPS data (or reports it on request). Personnel within the RCC then compare such data with either:
  a) the previously filed flight plan;
  b) known no-fly zones; or
  c) both a) and b).

If the position or track of the UA is deemed unsatisfactory, RCC authority options are as stated above.

3) Visual or radar sightings of the UA are compared with either:
  a) the previously filed flight plan;
  b) known no-fly zones; or
  c) both a) and b).

If the position or track of the UA is deemed unsatisfactory, RCC authority options are as stated above. The sighting information is obtained by any of the following "monitoring means":
  a) other aircraft, including:
    i) passenger, commercial or military aircraft who site the UA incidentally;
    ii) other UA, which are in place to police UA (and other) air traffic;
    iii) an IAC, if dispatched; and
  b) terrestrial stations, including RCCs and air traffic control installations;

Furthermore, the UA may carry a locator beacon which assists tracking of it and serves a purpose similar to that of visual/radar sightings.

In a preferred embodiment of the invention, Approach #2 is carried out with a UA with a UI (with or without a PW). (If the UA transmits its location and/or transmits deviations from flight plan, the transmission is meaningless without a UI.) Obviously, remotely controlled destruction requires a UI.

In an alternate embodiment of the invention, an aircraft which does not have a UI, which is detected by any of the aforementioned monitoring means may be requested to present a flight plan. Such request may be transmitted to it by
1) an IAC in close proximity, on a recognized/commonly agreed upon frequency allocation; or
2) a non-local RCC, on such a frequency allocation, in which case coordinates with sufficient precision to identify the UA in question would be used as the identifier.

Failure to comply with the request for flight plan would result in either:
1) destruction of the UA; or
2) escort of the UA by the IAC until such time as:
a) the UA is no longer deemed to be a threat; or
b) a decision is made to destroy the UA.
C) Approach #3: Each UA is required to allow itself to be controlled by an alternate pilot, upon the request of the alternate pilot. The alternate pilot, representing a known/safe/recognized/responsible authority can:
1) test whether the UA has such capability; and
2) if necessary, assume control of the UA.

This approach allows policing of UAs by adding the option of alternate pilot, "Alt-P", control. The alternate pilot controls the UA by any means of information exchange as is known in the art including radiofrequency, optical, and infrared means.

The Alt-P first determines whether the aircraft is controllable by the Alt-P. This may be determined in one or more of the following ways:

1) The Alt-P may interrogate the UA and determine from it's UI whether the UA is controllable. To do this, the Alt-P may access a database containing the UIs of known controllable UAs.

2) The Alt-P may send a test signal on a frequency and with modulation and coding format known to be used for UAs. If the UA is a controllable one, the UA sends back a confirmation signal indicating that it is controllable.

3) The Alt-P may send a test control signal on a frequency and with modulation and coding format known to be used for UAs. The test control signal includes a flight control command which results in a test motion (e.g. momentarily roll five degrees one way and then momentarily roll five degrees the other way and then return to previous course). The Alt-P confirms that the desired result has occurred by either:

a) visual inspection, if the Alt-P is in the near vicinity of the UA; or
b) a telemetry signal from the UA, originating from sensors within the UA.

Test control signals may control pitch, yaw, throttles, etc.

If the Alt-P deems necessary, the Alt-P may take control of the UA and fly it to an appropriate destination.

If the Alt-P determines that the UA has been modified (e.g. post production, or even post take-off) so that the Alt-P cannot fly the UA in a way that was allowed for in the initial specifications, the Alt-P may take action to cause the destruction of the UA. (If not in visual range of the UW the Alt-P can make such a determination with a UA that has a UI.) If the UA was not designed to be controllable by an Alt-P, the Alt-P will then decide (based on existing regulations concerning controllability of a UA, and based on the actions of the particular UA) whether to allow the current UA flight to continue.

The Alt-P may be located within the vicinity of the UA, or at a greater distance. In parallel to the discussions of remote aircraft control in U.S. Pat. No. 6,917,863 and in U.S. patent application Ser. Nos. 10/919,169 and 11/373,712, the advantage of limiting Alt-P actions to local Alt-Ps is the security means available to a short range communications link (i.e. using methods such as a high output controller transmitter and a low sensitivity UA receiver, and using highly directional transmission/reception means). A short range communications link is therefore much less likely to be accessed by an unauthorized person than is a long range link. The advantage of using a long range link is that it can be accessed immediately, upon the detection of a suspicious UA; the delays implicit in 1) sending an IAC; and
2) awaiting its arrival at the vicinity of the UA are not encountered.

UAs which allow Alt-P systems give the UA policing community another option beyond either:
1) further observe the UA; or
2) destroy the UA.

Alt-P systems may be used with or without UI/PW systems and with or without systems which compare aircraft position and velocity vectors with those called for by the flight plan.

The aforementioned system functions are enabled/facilitated and rendered more secure/robust by sub-systems including:
tamper detecting seals;
write-once-only-memory (e.g. so called PROMs (programmable read-only memories), EPROMs, EEPROMs, etc. as are known in the art, and as are, hereinbelow referred to as "XPROMs");
encryption/encoding circuits and techniques;
destructive means aboard the UA.

These are further discussed hereinbelow.

DESCRIPTION OF THE PREFERRED EMBODIMENTS

Figure 1:
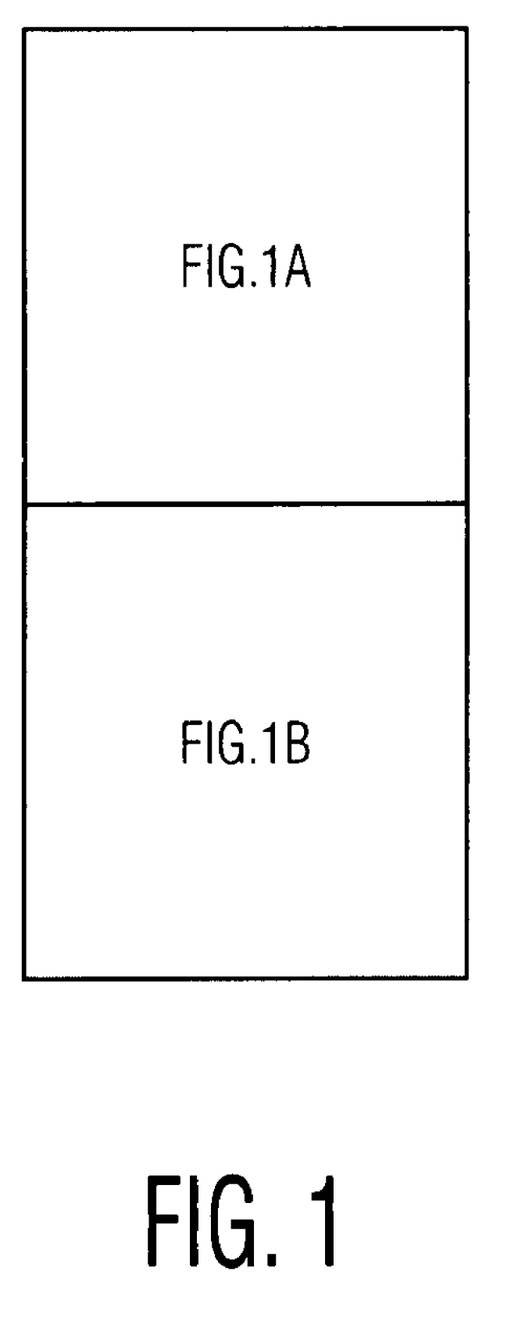
FIG. 1, comprising FIGS. 1A and 1B in combination shows a flow diagram of the operation of an algorithm for the policing of UAs.
Figure 1A:
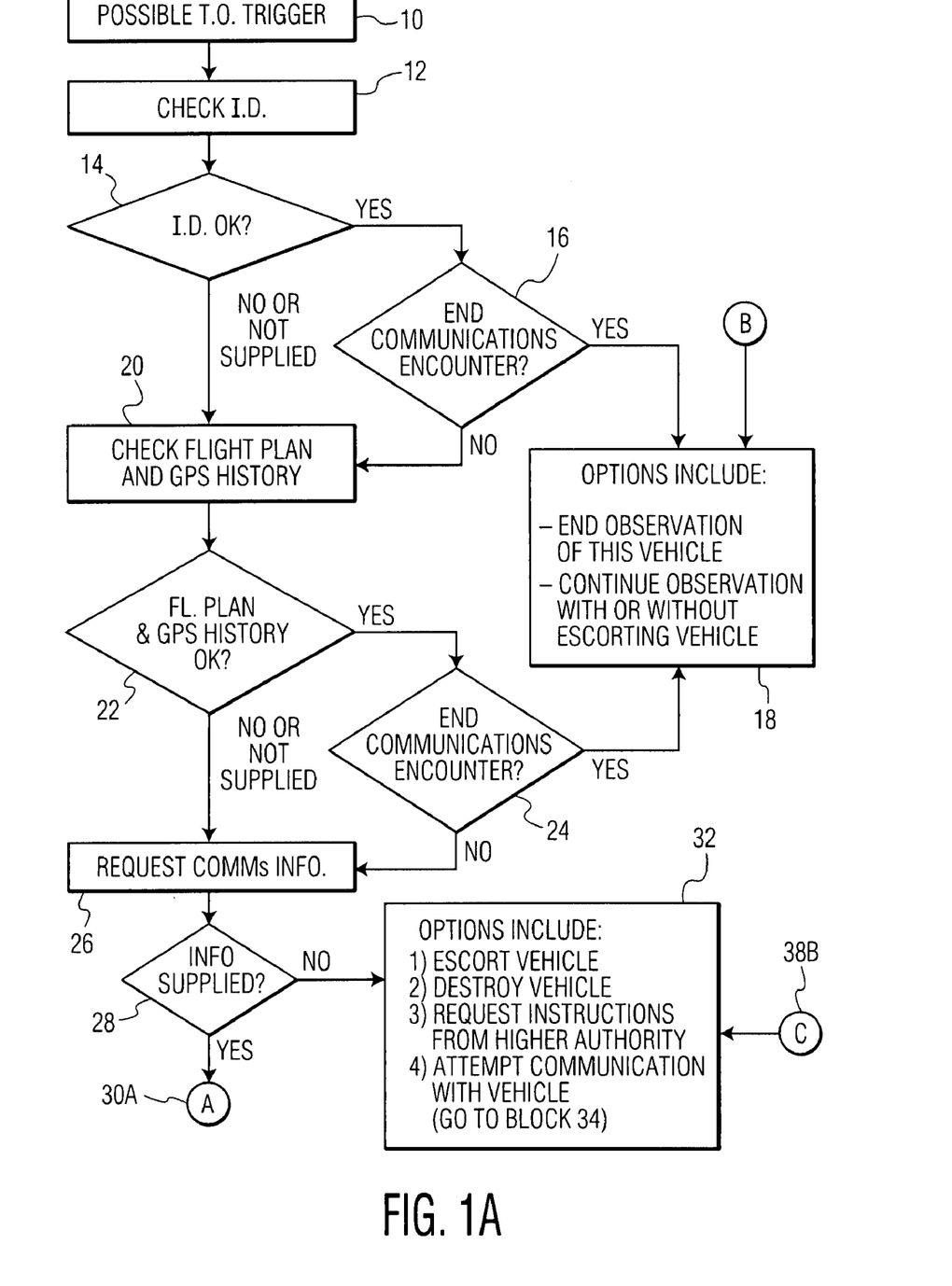
Figure 1B:
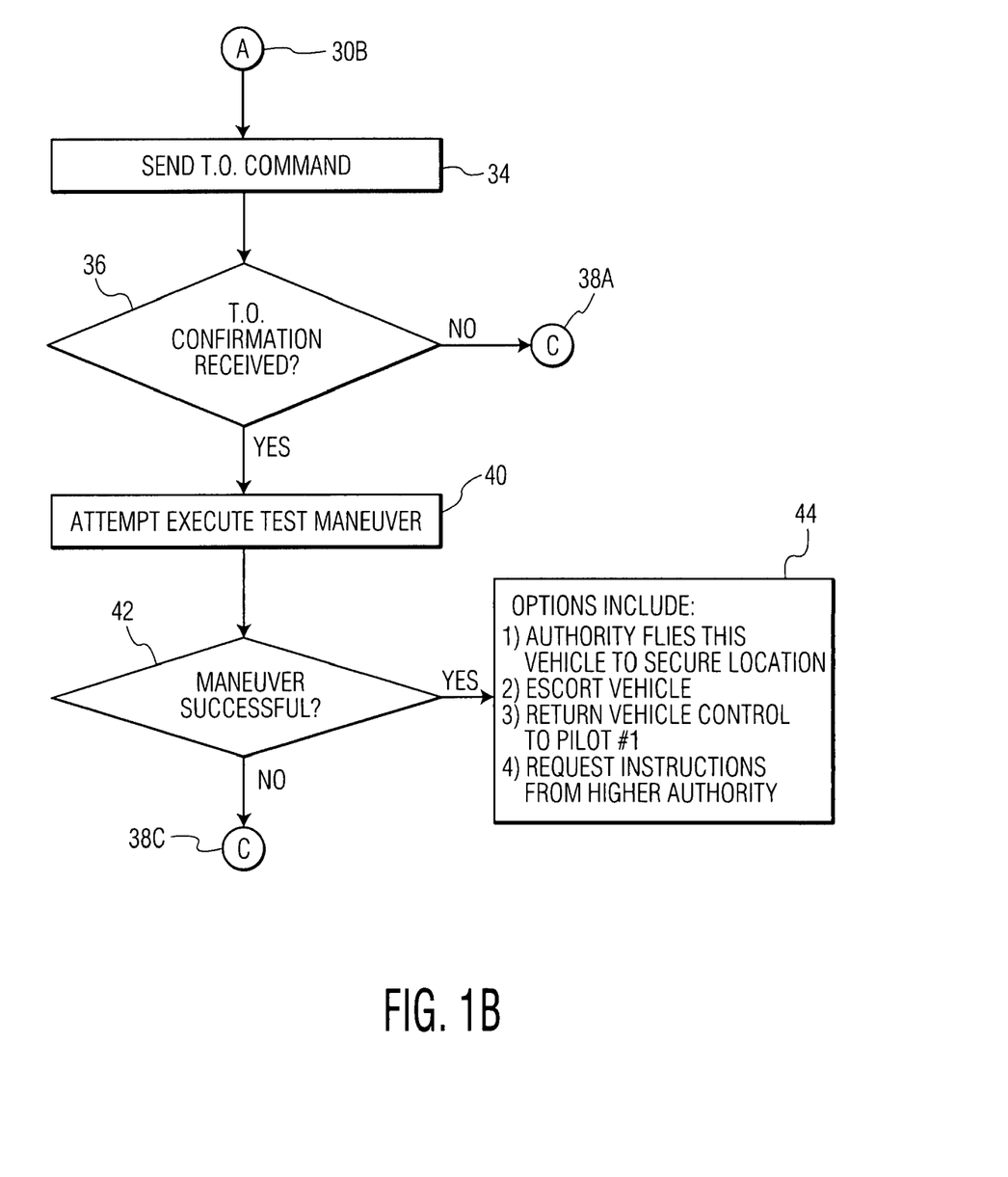

FIG. 1 consists of FIG. 1A and FIG. 1B, and shows an algorithm for policing UAs. The algorithm begins with block 10, an indication of a possibly improper UA. The basis of the impropriety could be:
a) information provided to a policing authority (PA) from one of many possible sources of security information;
b) information from a computer (or person who operates the computer), which tracks the position of UAs;
c) information from a computer (or person who operates the computer), which tracks the flight plans of UAs;
d) information from a computer (or person who operates the computer), which compares the positions and flight plans of UAs; and e) GPS or radar or other sighting information (from a ground-based, sea-based, air-based or space-based observer or observation apparatus, indicating encroachment of a UA into a sensitive space.

"Possible T.O. Trigger" 10 indicates an indication, such as listed hereinabove, for possible takeover (TO) of the UA. The takeover would result in a) removal of the UA pilot (first pilot herein) control; and
b) institution of control by either a local or remote pilot (second pilot) who is part of a PA.

In one embodiment of the invention, the second pilot checks the identification of the UA, block 12. The check could entail any one of a variety of methods known in the art, including:

a) interrogating an identifying device aboard the UA; and
b) observing the exterior of the UA, which may include:
   i) identifying alphanumeric or other surface based pattern, using visible light;
   ii) using a laser to identify coded paint, as is known in the art.

The interrogation of the identifying device, above, may take place by radiofrequency communication on a channel which has been designated specifically for the purpose of UA identification (ID) and policing. If one or more such channels are allocated, the PA may need to attempt communication on each such channel. The ideal situation would be statutory requirement that every UA (or almost every UA) be outfitted with equipment which allows communication on a known, agreed upon channel, using an agreed upon communication protocol known to at least the PA and the UA operator.

At block 14, the PA determines if the ID is acceptable. Such determination may be based on:

a) a list, appropriately disseminated, of properly registered UAs; and/or
b) a list, appropriately disseminated, of UAs which are on a "watch list," indicating the potential for inappropriate UA behavior.

If the ID is acceptable, block 16, the PA:
a) may end the communication encounter, in which case the PA options, block 18, would be:
   i) ending the observation of this particular UA; or
   ii) continuing observation (with some enhancement of the level of surveillance above that of other UAs), with or without escorting the vehicle. If the PA is aboard an aircraft in proximity to the UA, such escorting may begin promptly. If the PA is not in proximity to the UA, escorting may consist of dispatching a chase aircraft which flies to the location of the UA and stays in proximity until there is no longer any need for escort.

If the identification is unsatisfactory, or if—at block 16—the PA chooses not to end the communications encounter with the UA, the PA, block 20, may request one or more of:
a) a UA flight plan;
b) the UA GPS history (i.e. a history of each previous location that the UA has been, indicated by space and time coordinates); and
c) a comparison of the UA flight plan and the GPS history, the comparison indicating whether the UA has complied with its flight plan.

Each of a) b), and c) may be stored in a memory unit within the UA, or stored in a ground based facility that tracks UAs, see hereinbelow.

If the PA finds that the flight plan, the GPS history, and/or the comparison of the two is acceptable, then block 22 leads to 24, at which point the PA may choose to end the communications encounter, with options then per block 18, as discussed hereinabove.

If (a) the flight plan/GPS history analysis yields unsatisfactory results, or is not responded to at block 22: or if (b) at block 24 the PA decides that not enough information has been presented to reach a decision about whether the UA flight should be allowed to continue under the control of the first pilot, then, at block 26, the PA requests communications information from the UA. This information may include one or more of:

a) the frequency or channel on which the UA transmits telemetry to the UA pilot;
b) the frequency or channel on which the UA receives commands from the UA pilot;
c) the system or methodology that the UA and the UA pilot use for channel hopping;
d) the system or methodology that the UA and the UA pilot use for encoding and decoding exchanged information;
e) the system or methodology that the UA and the UA pilot use for encrypting and decrypting exchanged information;
f) passwords, if any; and
g) any other communication formatting or executing information necessary for the PA pilot to fly the UA.

The step of requesting the communications information may come earlier in the algorithm shown in FIG. 1. It may come between blocks 10 and 12, or it may come immediately before block 20. Furthermore, the request for information may be from another UA or the pilot of another UA.

If the requested information is not supplied, block 28 to block 32, the PA options include:

a) escorting the UA (with the option of more aggressive action at a later time);
b) destroying the UA;
c) requesting instructions from a higher authority; and
d) attempting communication with the UA; If this leads to establishment of a working communications link, the algorithm proceeds as described hereinbelow for block 34; If this does not lead to a working link, options a), b) and c) remain as choices.

The attempt d) may entail a trial-and-error effort to determine the needed communication parameters, or may entail use of information stored in a database.

The PA may skip to the options listed in block 32 if an unsatisfactory result occurs at the time of either ID checking or the assessment of flight plan and/or GPS history.

If the requested communication information is supplied, block 28 to 30A to 30B (FIG. 1A, and continuing on FIG. 1B) to 34, the PA sends a takeover command to the UA. In one preferred embodiment of the invention, the takeover (TO) command causes a) the UA to allow piloting by the PA;
b) the UA to exclude piloting by the UA pilot (the first pilot); and
c) the UA to send a confirmation signal that the TO command has been executed.

Apparatus which allows for the execution of such a commands is presented hereinbelow.

In other embodiments of the invention:
a) there may not be a TO confirmation signal;
b) there may not be a lockout of the first pilot from control; and
c) there may not be a unique TO command; Rather, specific commands (e.g. move rudder by a specific amount) would be sent to the UA.

Referring again to the embodiment in which a confirmation signal is sent when a TO command is enacted, if the TO confirmation is not received following the transmission of a TO command, block 34 to 36 to 38A to 38B (FIG. 1A) to 32 with options including:

include:
a) escorting the UA (with the option of more aggressive action at a later time);
b) destroying the UA;
c) requesting instructions from a higher authority; and
d) again transmitting a TO command.

If a TO confirmation signal is received, block 34 leads to 36 and then to 40, at which time the PA may attempt to execute a test maneuver. The test maneuver is the transmission of a command which causes a change in aircraft attitude which may either be directly observed by a local PA (e.g. bank five degrees), or may be detected by apparatus onboard the UA (see below).

The purpose of the maneuver is to attempt to distinguish ill-intentioned UA pilots/vehicles from those with benign intentions; The assumption is that an ill-intentioned UA pilot would be much less likely to comply with a request to allow takeover of the UA by the PA. (Though it may be the case that an ill-intentioned UA pilot would not allow for the transmission of information requested in blocks 12, 20 and 26, such denials are dealt with by the algorithm [and lead to block 32].) It may be that an ill-intentioned pilot would have allowed the transmission of information at blocks 12, 20 and 26 hoping to avoid detection.

If the test maneuver is not executed successfully, block 40 leads to 42, then to 38C and then to 38B (in FIG. 1A), with PA options including:
a) escorting the UA (with the option of more aggressive action at a later time);
b) destroying the UA;
c) requesting instructions from a higher authority; and
d) again transmitting a test maneuver.

If the test maneuver is successful (indicating that the PA is indeed capable, at this point, of piloting the UA) then block 40 leads to 42, and then to 44 with PA options including:
a) the PA, now in control of the UA, flying the vehicle to a more secure location;
b) escorting the UA (with the option of more aggressive action at a later time);
c) returning control of the vehicle to the first (i.e. UA) pilot;
d) requesting instructions from a higher authority.

The reasoning behind option c) is that if the first pilot permitted each of the aforementioned steps/requests by the PA, the likelihood of his being an ill-intentioned pilot is substantially decreased, compared to the pre-evaluation likelihood.

Figure 2:
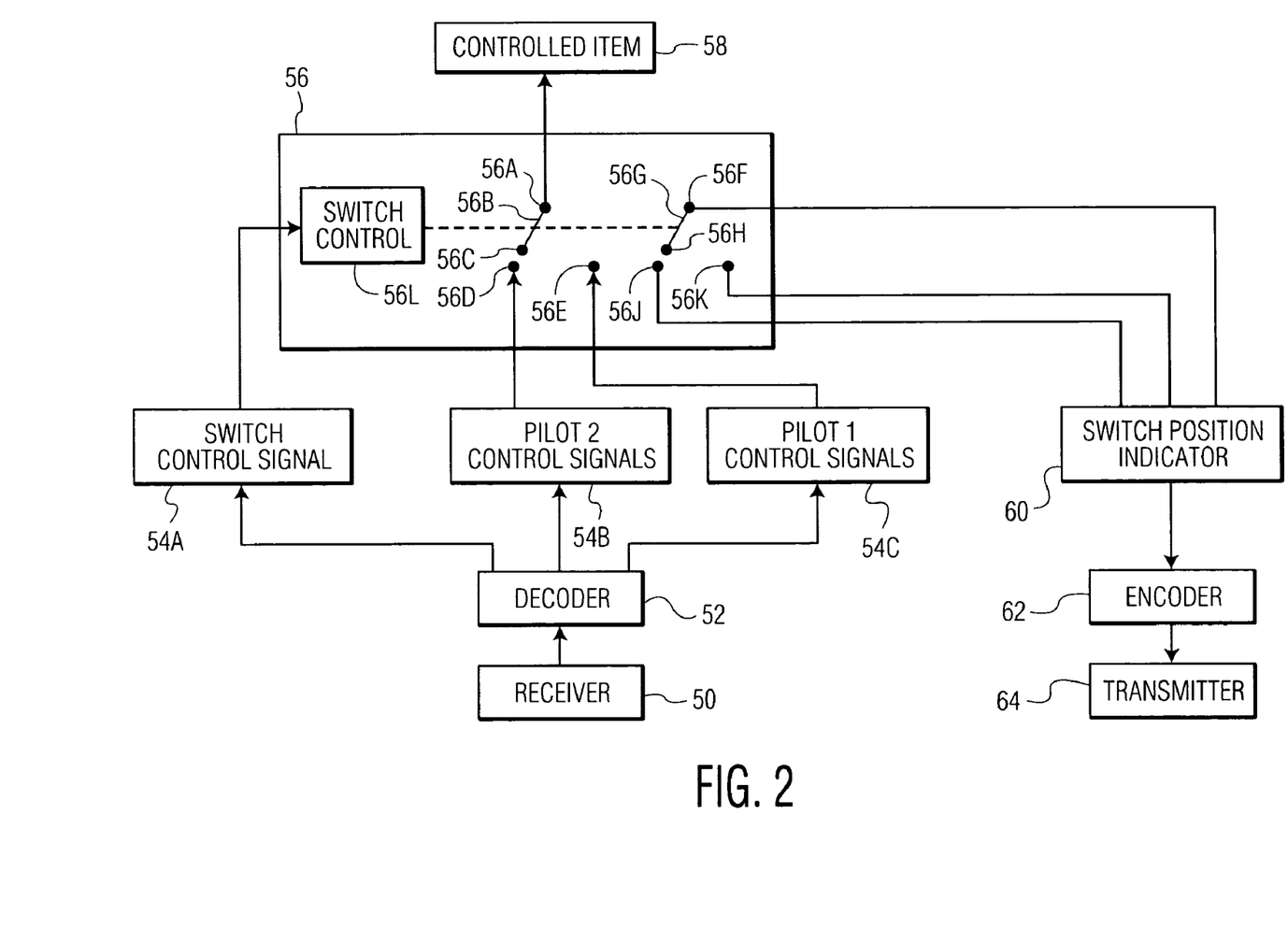
FIG. 2 shows a block diagram for determining the source of control of a UA.

FIG. 2 shows a form of apparatus which may be aboard a UA which allows for the aforementioned tasks including the transfer of control from the first pilot to the PA following a TO signal, and the transmission of a TO confirmation. The switching apparatus shown is intended to be viewed schematically; though an "old technology" double-pole-double-throw relay may accomplish the task of switching control from the UA pilot (also referred to herein as "pilot 1") to the PA (also referred to as "pilot 2"), more sophisticated switching arrangements, including computer hardware and/or software based approaches, are possible and are known in the art.

In the figure, signals to the UA are received by 50, and decoded (and decrypted, as necessary) by 52. Under ordinary circumstances, the UA first pilot control signals 54C pass to the appropriate item to be controlled 58 (e.g. rudder, throttles etc.) via the path 54C to 56E to 56C to 56B to 56A to 58. (The poles in the figure are shown in the other position, i.e. allowing control by the PA pilot.)

When the PA wishes to take control of the aircraft, a switch control signal is sent along the path 50 to 52 to 54A to 56L. Switch control 56L causes the two components of the switch to move to the pilot 2/PA pilot (i.e. the left-most position in the figure). The result is that pilot 1 control signals can no longer pass beyond 56E, and that pilot 2 signals control items 58 along the path 50 to 52 to 54B to 56D to 56C to 56B to 56A to 58. If, at a later time, the PA is satisfied that control of the UA can safely be returned to the first pilot (option 3 in block 44 of FIG. 1B), a switch control signal sent to 54A restores control to the first pilot.

The switch components 56F, 56G, 56H, 56J and 56K allow the PA to know the switch position: Switch position indicator 60 senses which of two positions the switch is in, via 56F-56K, the information is encoded and preferably encrypted at 62 and transmitted to the PA by 64.

Figure 3:
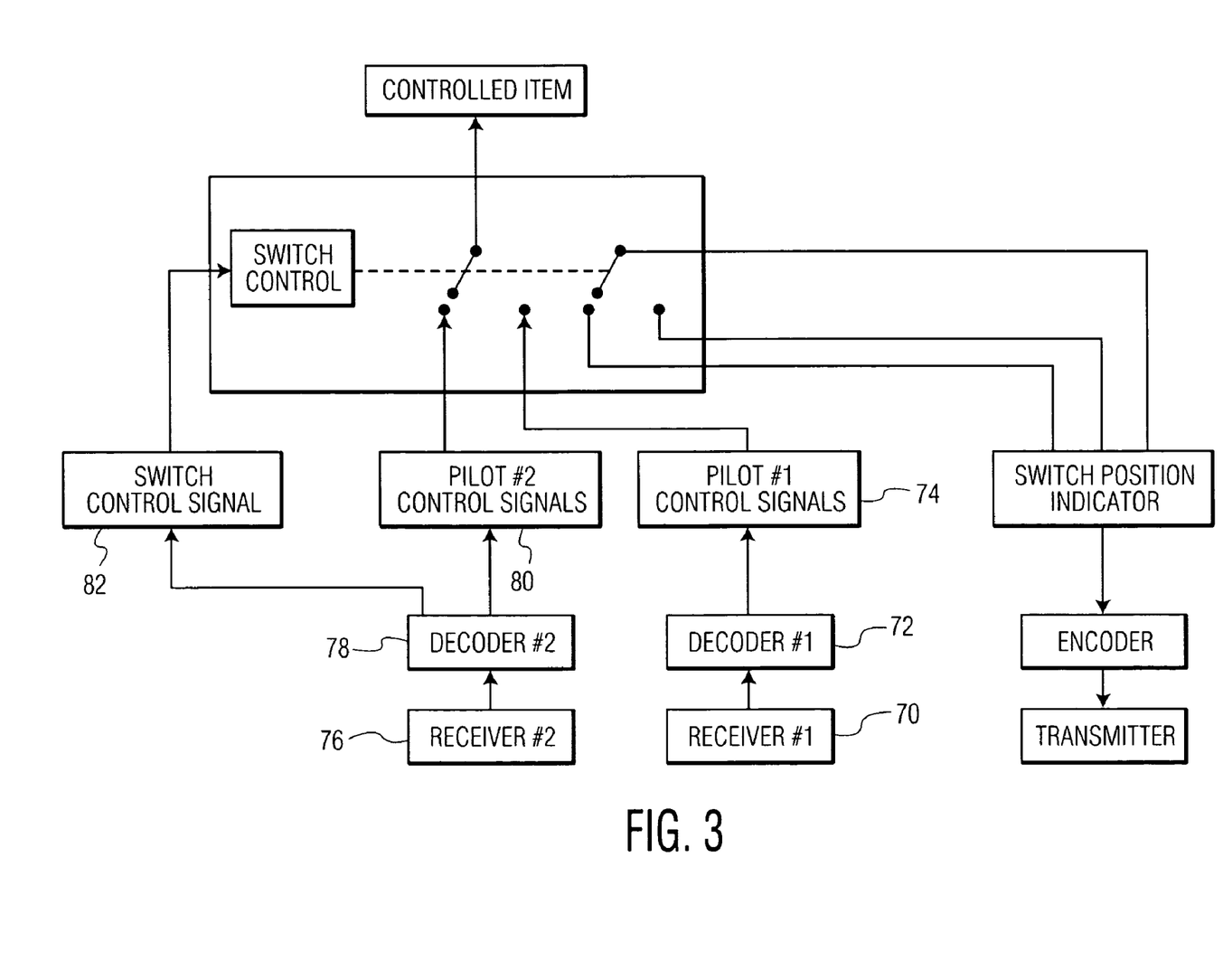
FIG. 3 shows another block diagram for determining the source of control of a UA.

An alternate embodiment of the switching arrangement is shown in FIG. 3. FIG. 3 differs from FIG. 2 only in that FIG. 3 contain separate receiver/decoder elements for the pilot #1 signals and for the pilot #2 signals. One way of limiting the chance that an unauthorized person/hacker could usurp the authority of the PA and attempt to obtain control over a UA would be to use one or more of:
a) high output transmitters for PA control signals;
b) low sensitivity receivers for PA control signals;
c) highly directional antennae at each end of the PA-UA communication link;
d) upwardly oriented UA antennae, to communicate with a PA aircraft located at a higher altitude than the UA (This might require an antenna for UAV-PA communication which is separate than the one for UA-first pilot communications. [The separate antenna is not shown in the figure.]; and
e) time dependent varying of the orientation of either the PA antenna or the UA antenna (with corresponding adjustments by the PA pilot to compensate for such orientation changes).

In addition, the aforementioned unauthorized controller exclusion would employ encoding and encryption techniques as are known in the art.

Referring again to FIG. 3, first pilot signals are received along the path 70 to 72 to 74. PA pilot signals are received by a low sensitivity receiver 76, decoded by 78, thereby giving rise to pilot #2 (PA pilot) control signals 80 and pilot #2 switch control signals 82. Embodiments of the invention with two receivers (70 and 76) and a single decoder are possible. Embodiments of the invention which share not only a decoder but which also share all but the "front end" of the receiver are possible.

Figure 4:
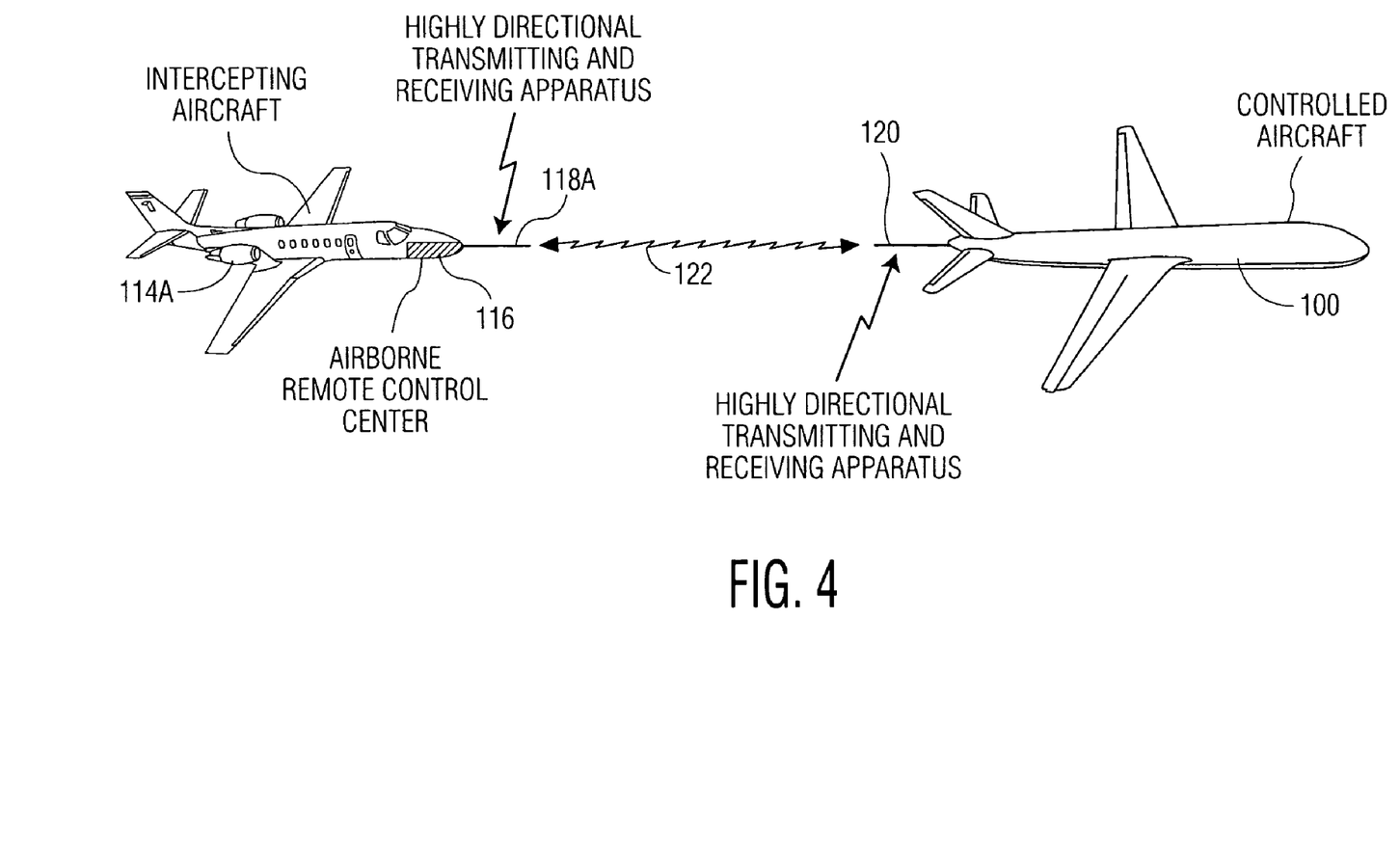
FIG. 4 shows a system of highly directional transmission between a UA and an aircraft for policing UAs.

FIG. 4 shows the use of highly directional apparatus aboard the UA 100 and a PA aircraft 114A. Control signals 122 are sent from an airborne remote control center 116 via directional antenna 118A aboard 114A to directional antenna 120. Directional apparatus may also be for transmission from 100 to 114A.

Figure 5:
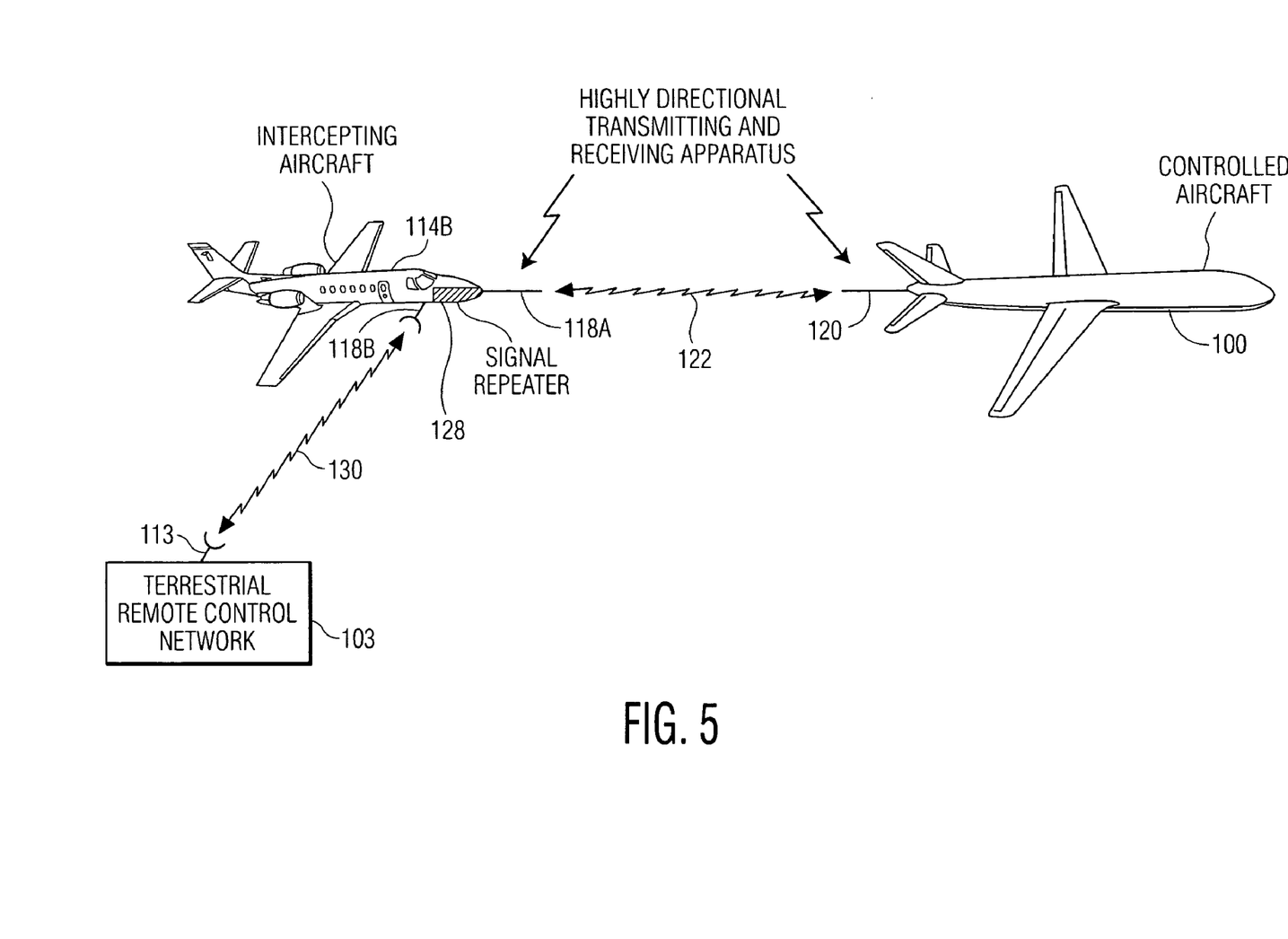
FIG. 5 shows another system of highly directional transmission between a UA and an aircraft for policing UAs, which includes a terrestrial station.

FIG. 5 shows an embodiment of the invention in which an intercepting aircraft 114B acts as a repeater unit, allow a terrestrial (land or sea-based) remote control network 103 to control a UA 100. Signals to the UA traverse the path 103 to 113 to 118B to 128 (signal repeater equipment) to 118A giving rise to signals 122 to 120 to 100. (The reversed sequence pertains to telemetry and other signals from 100 to 103.) Antennae 113 and 118B would be operative to vary their orientation to optimize signal strength based on the positions of 103 and 114B.

Figure 6:
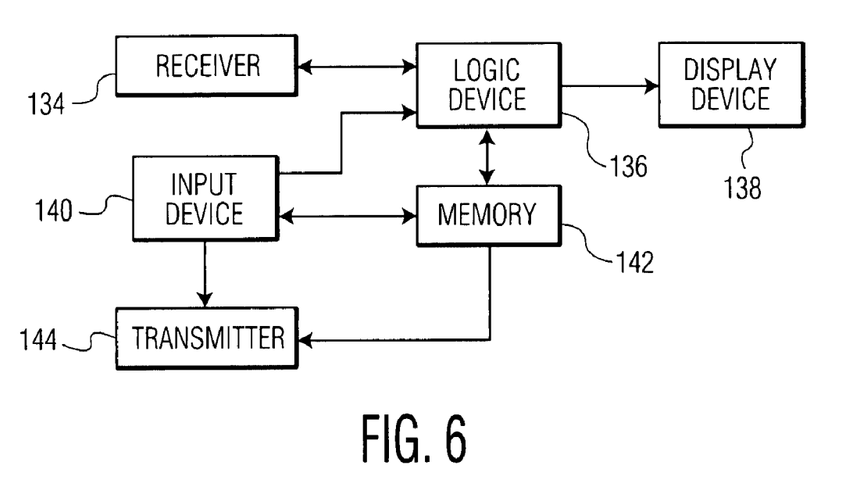
FIG. 6 shows a block diagram of apparatus for policing UAs.

FIG. 6 shows apparatus which comprises a preferred embodiment of the PA apparatus for communicating with a UA. The PA inputs commands via input device 140, which are transmitted by 144. The PA receives UA signals via 134 which may be linked directly to display device 138, or to 138 via logic device 136. 136 allows for the comparison, if desired by the PA, of GPS history and intended flight plans. The flight plans may be stored in memory 142 or received at the time that the GPS history is received. 142 may also store a list of potentially problematic UAVs, i.e. UAVs to be watched more carefully than others. 142 may also store flight routines which allow a PA pilot to fly a UA to a specific destination with a minimum of control activity; 140 may input the control signals which allow for these flight routines to go directly to 144, or to go to 144 via from 142. 142 may also serve to record all PA actions that issue from 140. The combination of 136 and 142 may act as a flight management computer and/or autopilot for the UA when it is controlled by the PA who provides input via 140.

Figure 7:
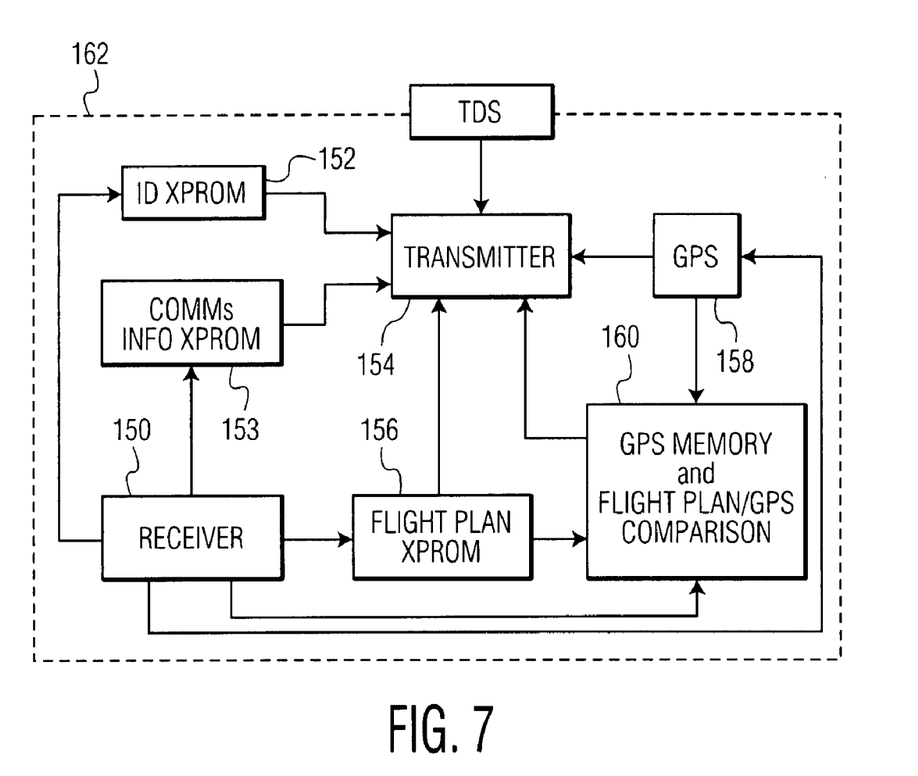
FIG. 7 shows a block diagram of apparatus aboard a UA which allows it to be policed.

FIG. 7 shows a system aboard the UA which communicates with that of the system shown in FIG. 6. The system in FIG. 7 contains receiver 150, which, 1) on receipt of a suitable signal, 150 causes identification XPROM 152 (which is either a PROM, an EPROM, an EEPROM or similar write-once-only-memory device as is known in the art) to signal transmitter 154 (and/or causes transmitter 154 to send the UI contained in 152);

2) on receipt of another type of signal, and of flight plan information, causes the writing of flight plan information into flight plan XPROM 156;

3) on receipt of another type of signal, causes the transmission of flight plan information from 156 to 154 to the PA;

4) on receipt of another type of signal, causes the transmission of communications information from XPROM 153 to 154 to the PA;

5) on receipt of another type of signal, causes the transmission of real-time GPS information from 158 to 154 and then to the UA;

6) on receipt of another type of signal, causes the transmission of either:
    i) GPS history stored in 160, to 154, to the PA;
    ii) a comparison of the GPS history stored in 160 and the flight plan information, to 154, to the PA.

160 may be a computer, part of a computer, a microprocessor, part of a microprocessor or a logic device or system of logic devices as is known in the art. GPS or other locator system information may be:
a) transmitted to a remote control center (RCC);
b) used as a basis for assessing compliance with the flight plan. The GPS data may be used to generate both the expected UA position and the expected UA velocity.
    160 may cause the transmission of:
a) all "raw data" related to the comparison of GPS data and the flight plan;
b) only the results of such comparisons that indicate significant deviation from the flight plan.

In a preferred embodiment of the invention, the apparatus consisting of elements 150 through 160 is enclosed within tamper detecting seal (TDS) 162.

Figure 8:
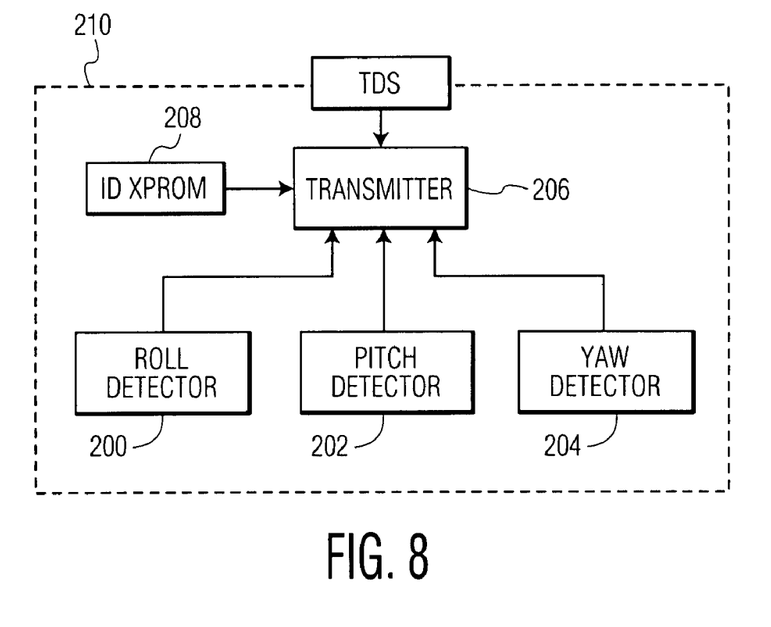
FIG. 8 shows a block diagram of apparatus aboard a UA which allows the assessment of its response to a policing authority command.

FIG. 8 shows apparatus aboard the UA which allows the RCC to determine if a test command sent by it has been received and executed. Not shown in the figure is:

a) the receiver which receives the command;
b) the aircraft apparatus which carries out the command; and
c) the linkage between a) and b).

If and when the command is executed, one of roll detector 200, pitch detector 202 or yaw detector 204 will register a change in sensed input corresponding to which of these was associated with the test command. (Other test commands are possible.) The output of these detectors is transmitted at 206. In a preferred embodiment of the invention, the transmission is accompanied by a UI from XPROM 208. In a preferred embodiment of the invention, the apparatus comprising elements 200-208 is enclosed in TDS 210.

Figure 9:
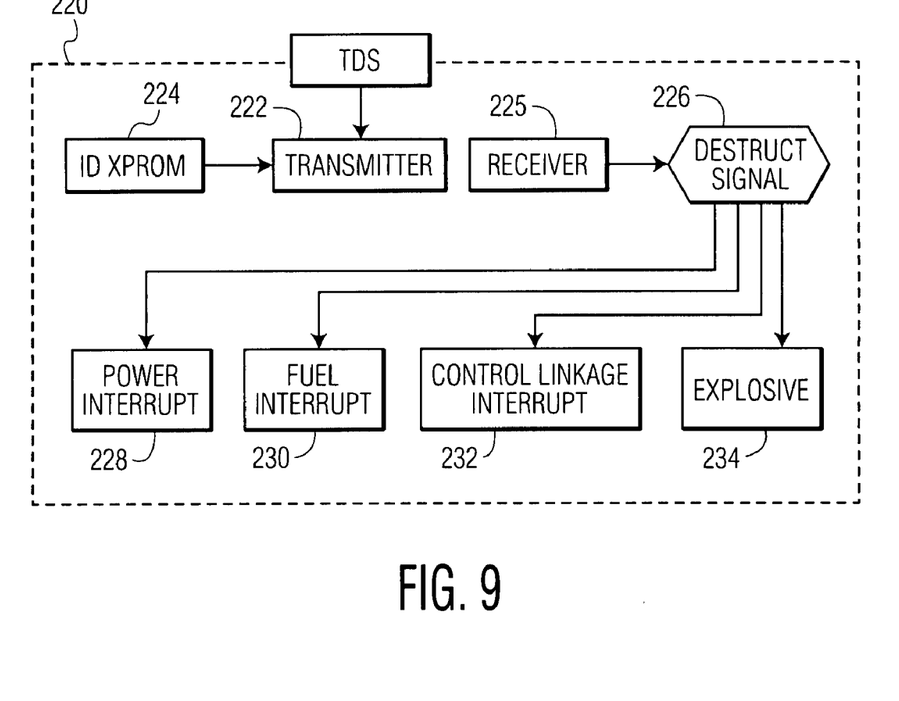
FIG. 9 shows a block diagram of apparatus aboard a UA which allows its destruction, if appropriately commanded.

FIG. 9 shows an apparatus which allows remotely triggered destruction of a UA. The apparatus is enclosed in TDS 220. Transmitter 222 confirms the identity of the UA with a UI from 224. In the event that an authorized person determines that it is not appropriate for the UA to continue its flight, and in the event that such UA authorized person does not wish to or cannot take control of the UA as a second pilot and fly it to an appropriate destination, the authorized person would have the option of destroying or incapacitating the UA using apparatus aboard the UA shown in the figure.

If the authorized person makes a destruct decision, a destruct signal, "DS" is sent. The DS is received by 225, from which, after appropriate decoding and decryption, a destruct signal is generated, indicated by element 226. Four options for executing such destruction are illustrated in the figure:

a) 228, indicating apparatus for interrupting electrical power distribution to critical elements within the UA;

b) 230, indicating apparatus for the interruption of fuel flow within the UA;

c) 232, indicating apparatus for interrupting the linkage to moving aircraft control elements (throttle, rudder, ailerons, flaps, etc.); and d) 234, indicating one or more explosive charges carried by the UA, which may be detonated in response to a signal 226.

Figure 10:
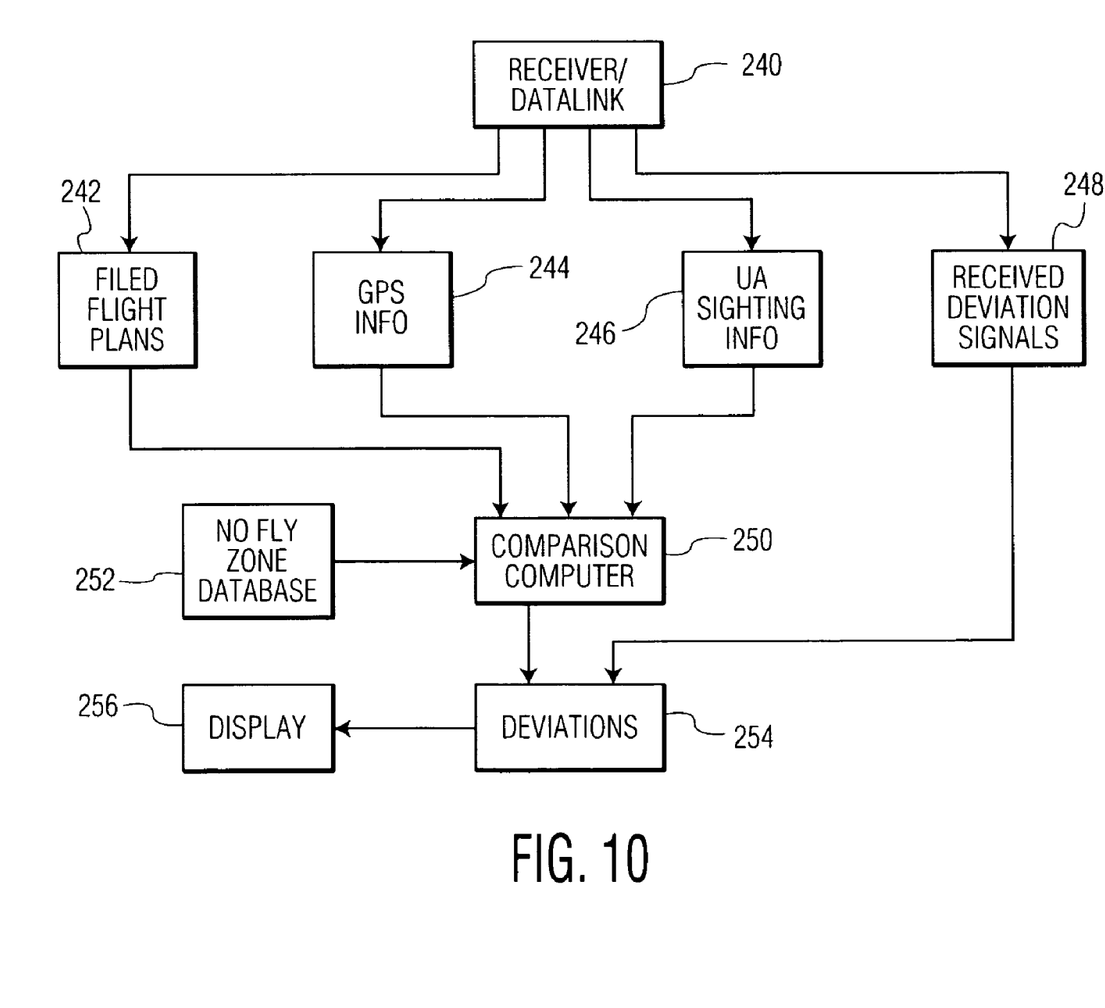
FIG. 10 shows apparatus to be used by a policing authority, for identifying UAs which may need assessment, because of potential, possible or actual inappropriate behavior by the UA.

FIG. 10 shows apparatus with which a remote control center (either terrestrial or airborne) may determine whether UA location and/or UA flight plans are appropriate. Receiver or datalink 240 receives four types of information:
a) filed flight plans 242;
b) GPS information 244, transmitted from GPS apparatus aboard UAs;
c) UA sighting information 246 (e.g. other aircraft reporting on the presence of a particular UA at a particular time and location); and
d) deviation signals 248 (such as those generated by element 160 in FIG. 7).

Comparison computer microprocessor/logic system 250 compares:
a) actual UA position information from 244 and 246 with expected UA position information from 242;
b) actual UA position information with known "no-fly" zones (stored in database 252); and
c) filed flight plans with no-fly locations.

254, i.e.(A) 248, and (B) the output of 250, indicating any of the three types of aforementioned deviations are displayed by 256. In a preferred embodiment of the invention, the display may also indicate one or more of:
a) the UI of the deviated UA;
b) the magnitude of the deviation;
c) historical information about the flight: i.e. details about the portions of the flight, if any, prior to the deviation;
d) historical information about the particular UA including:
    1) prior flights; and
    2) the owner; and e) enroute weather information for the UA, as a possible explanation for an off-course location.

The airspace may be patrolled for inappropriate UA activity by:

a) existing patrol networks;
b) one or many unmanned aircraft for the specific purpose of policing UAs;
c) one or many manned aircraft whose primary purpose is either passenger/commercial or military, but which may be outfitted with UA policing equipment; and
d) combinations of a), b) and c).

There has thus been shown and described a novel method and apparatus for managing unauthorized use of an unmanned aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of policing and managing the operation of a flying, unmanned, first aircraft in the event of usurpation of control of, malfunction of, or ill-intentioned use of, said first aircraft, said first aircraft being controlled remotely by a first pilot, not present on said first aircraft, said method comprising the steps of:
   (a) detecting inappropriate operation of said first aircraft;
   (b) transmitting a takeover command to said first aircraft to interrupt control of the operation of said first aircraft by said first pilot currently in control of said first aircraft; and
   (c) a second pilot, also not present on said first aircraft, transmitting control commands to said first aircraft to control the operation of said first aircraft, while excluding operation of said first aircraft by said first pilot, until the need for second pilot control of the first aircraft has ended or until said first aircraft has landed safely.

2. The method defined in claim 1, wherein said takeover command is transmitted from a ground station to said first aircraft.

3. The method defined in claim 1, wherein said control commands are transmitted from a ground station to said first aircraft.

4. The method defined in claim 1, further comprising the initial step of flying a second aircraft to within the vicinity of the first aircraft, thereby permitting visual observation of the first aircraft.

5. The method defined in claim 4, further comprising the initial step of providing a secure transmission link by and between a first transmitting and receiving device ("first T/R device") on the first aircraft and a second transmitting and receiving device ("second T/R device") on said second aircraft, thereby permitting secure communication between said first aircraft and said second aircraft.

6. The method defined in claim 5, wherein said takeover command is transmitted from said second aircraft to said first aircraft via said transmission link.

7. The method defined in claim 1, wherein said step of detecting inappropriate operation includes transmitting an interrogation command to said first aircraft and determining whether a response thereto, if any, is satisfactory.

8. The method defined in claim 4, wherein said step of detecting an inappropriate operation includes transmitting an interrogation command from said second aircraft to said first aircraft and determining whether a response thereto, if any is satisfactory.

9. The method defined in claim 8, further comprising the step of transmitting data from said first aircraft to said second aircraft via said transmission link in response to said interrogation command.

10. The method defined in claim 9, wherein said data includes information pertaining to the identity said first aircraft.

11. The method defined in claim 9, wherein said data includes information pertaining to the flight of said first aircraft and said control commands are transmitted from said second aircraft to said first aircraft via said transmission link.

12. The method defined in claim 9, wherein said first aircraft includes means including an altimeter and a GPS device for determining information pertaining to a current location in space of said first aircraft, and wherein said data includes said information pertaining to said location.

13. The method defined in claim 12, wherein said first aircraft further includes a memory in which is stored information pertaining to a current flight plan of the first aircraft, and wherein said data includes said information pertaining to the flight plan.

14. The method defined in claim 13, further comprising the step of comparing said information pertaining to said current location of said first aircraft with said information pertaining to the flight plan, and transmitting said takeover command if said location does not correspond to the flight plan.

15. The method defined in claim 1, further comprising the step of requesting authorization to transmit said takeover command, prior to transmitting said takeover command.

16. The method defined in claim 7, further comprising the step of requesting authorization to transmit said takeover command, prior to transmitting said takeover command.

17. The method defined in claim 9, wherein said data includes information pertaining to a communication protocol between said first T/R device and said second T/R device.

18. The method defined in claim 1, further comprising the step of requesting authorization to destroy said first aircraft, and destroying said first aircraft upon receipt of said authorization.

19. The method defined in claim 18, wherein said first aircraft includes means for causing its self-destruction and said method further comprises the step of transmitting a destruct command to said first aircraft to initiate operation of the self-destruction means.

20. The method defined in claim 9, wherein said first aircraft includes a video camera and wherein said data includes video information pertaining to said first aircraft.

21. The method defined in claim 5, further comprising the initial step of providing a transmission link by and between a third transmitting and receiving device ("third T/R device") on the second aircraft and a fourth transmitting and receiving means ("fourth T/R device") at a ground station, thereby permitting communication between said second aircraft and said ground station, whereby said second aircraft serves as a repeater station for communications between said ground station and said first aircraft.

22. The method defined in claim 5, wherein said first T/R device on said first aircraft include means for transmitting and receiving preferentially in the direction of said second aircraft.

23. The method defined in claim 5, wherein said second T/R device on said second aircraft include means for transmitting and receiving preferentially in the direction of said first aircraft.

24. The method defined in claim 11, wherein said second aircraft comprises a flight control station to enable said second pilot aboard said second aircraft to control said first aircraft.

25. The method of claim 7, wherein said interrogation command is a request to provide at least one type of communication information selected from among the group consisting of:
   a) at least one of the frequencies for communication with said first aircraft;
   b) at least one of the channels for communication with said first aircraft;
   c) the format for communication with said first aircraft; and
   d) the method of encoding commands transmitted to said first aircraft; and
   wherein a satisfactory response is defined as
   a) the receipt of said communication information;
   b) using said information to send a test signal to said first aircraft; and
   c) the detection of a proper response to said test signal by said first aircraft.

26. The method of claim 25, wherein said test signal is a request for at least one of:
   a) a flight plan;
   b) data indicating the previous positions of the aircraft as determined by GPS and an altimeter;
   c) a command to execute a change in one of the movable surfaces of the first aircraft; and
   wherein said proper response is indicated by at least one of:
   a) a flight plan which matches a previously registered flight plan;
   b) a flight plan which matches the current position of said first aircraft; and
   c) at least one of (i) a movement of a moveable surface of said first aircraft, and (ii) a movement of said first aircraft, in correspondence with a command to execute a change in said moveable surface.

* * * * *